United States Patent
Stiesdal

(10) Patent No.: US 9,388,598 B2
(45) Date of Patent: Jul. 12, 2016

(54) SLIPFORMED CONCRETE TOWER

(71) Applicant: SIEMENS AKTIENGESELLSCHAFT, München (DE)

(72) Inventor: Henrik Stiesdal, Odense C (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/426,192

(22) PCT Filed: Sep. 16, 2013

(86) PCT No.: PCT/EP2013/069093
§ 371 (c)(1),
(2) Date: Mar. 5, 2015

(87) PCT Pub. No.: WO2014/079602
PCT Pub. Date: May 30, 2014

(65) Prior Publication Data
US 2015/0252582 A1 Sep. 10, 2015

(30) Foreign Application Priority Data

Nov. 21, 2012 (EP) .................................. 12193586

(51) Int. Cl.
*E04H 12/34* (2006.01)
*E04G 11/20* (2006.01)
(Continued)

(52) U.S. Cl.
CPC .............. *E04H 12/341* (2013.01); *E04G 11/20* (2013.01); *E04G 11/22* (2013.01); *E04G 11/28* (2013.01);
(Continued)

(58) Field of Classification Search
CPC ......... E04G 11/22; E04G 11/20; E04G 11/34; E04G 11/28; E04G 21/0427; E04G 21/0445; E04G 12/12; E04H 12/341; B28B 5/00; B28B 7/0088; Y10E 10/728
See application file for complete search history.

(56) References Cited

U.S. PATENT DOCUMENTS 1,891,160 A * 12/1932 Jespersen ...................... 264/32
3,509,606 A * 5/1970 Fisher ............................ 425/63
(Continued)

FOREIGN PATENT DOCUMENTS

| DE | 19936602 A1 | 2/2001 |
| GB | 1316010 A | 5/1973 |
| WO | 0107731 A1 | 2/2001 |

OTHER PUBLICATIONS

International Search Report for PCT application No. PCT/EP2013/069093, mailed on Dec. 20, 2013.
Extended European Search Report for European Application No. 12193586.0, mailed on May 24, 2013.

*Primary Examiner* — Andrew J Triggs
(74) *Attorney, Agent, or Firm* — Schmeiser, Olsen & Watts, LLP

(57) ABSTRACT

An assembly and method of constructing a concrete tower is provided. The method includes steps of erecting a central pillar, mounting a platform on the central pillar, setting a slipform defining a portion of the concrete tower, pouring liquid concrete from the platform into the slipform, and leaving the liquid concrete to solidify in the slipform. The slipforming repeats to form further portions of the concrete tower. Each of the further portions of the concrete tower is formed on top of a preceding one of the portions of the concrete tower. The assembly includes a central pillar, at least one slipform and a platform mountable on the central pillar and comprising means for pouring liquid concrete into the at least one slipform.

13 Claims, 2 Drawing Sheets

Figure 1:
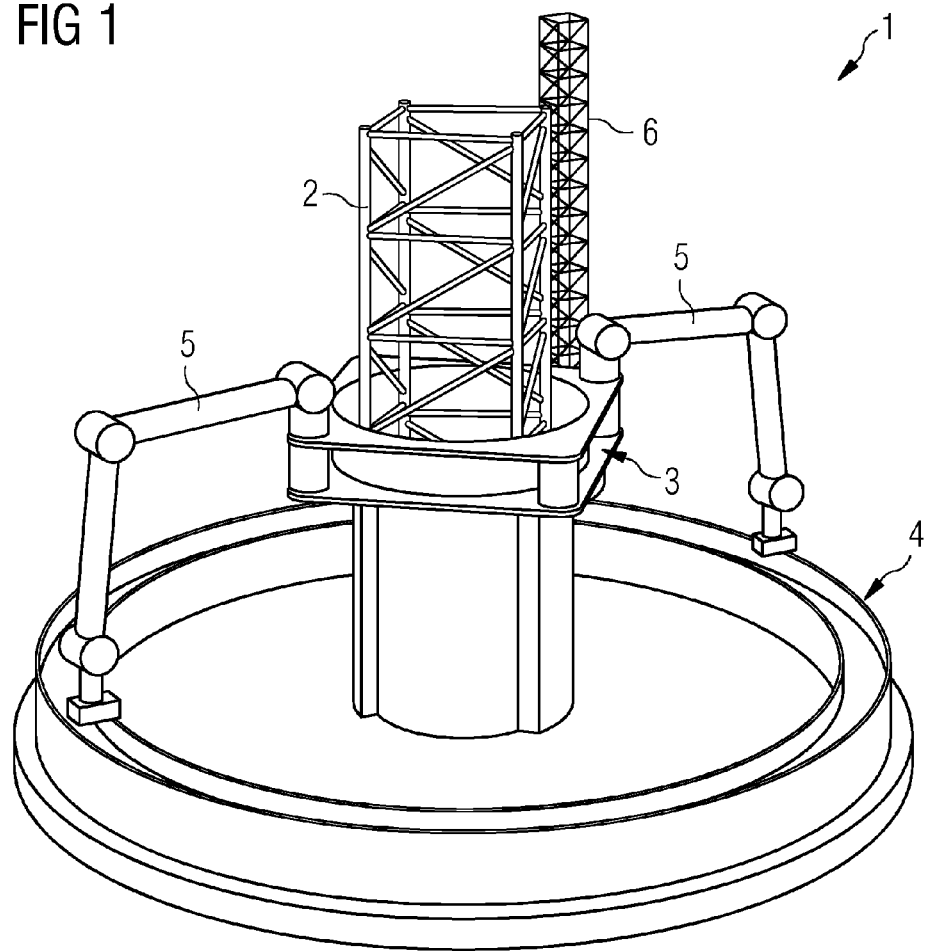

(51) Int. Cl.
  *E04G 11/28* (2006.01)
  *E04G 21/04* (2006.01)
  *E04G 11/22* (2006.01)
  *F03D 11/04* (2006.01)
  *F03D 1/00* (2006.01)
  *E04H 12/12* (2006.01)
(52) U.S. Cl.
  CPC ........ *E04G 21/0427* (2013.01); *E04G 21/0445* (2013.01); *E04H 12/12* (2013.01); *F03D 1/001* (2013.01); *F03D 11/04* (2013.01); *Y02E 10/728* (2013.01)

(56) References Cited

U.S. PATENT DOCUMENTS

| | | | | |
|---|---|---|---|---|
| 3,510,098 | A * | 5/1970 | Fox | E04G 11/065 249/1 |
| 4,320,075 | A * | 3/1982 | Nielson | E04G 11/34 264/228 |
| 8,281,546 | B2 * | 10/2012 | Thompson | 52/745.17 |
| 2010/0281819 | A1 | 11/2010 | Thompson | |
| 2014/0348662 | A1 * | 11/2014 | Schibsbye | E04H 12/341 416/244 A |

* cited by examiner

SLIPFORMED CONCRETE TOWER

CROSS-REFERENCE TO RELATED APPLICATIONS

This application claims priority to PCT Application No. PCT/EP2013/069093 having a filing date of Sep. 16, 2013, based off of EP12193586.0, having a filing date of Nov. 21, 2012, the entire contents of which are hereby incorporated by reference.

FIELD OF TECHNOLOGY

The following relates to a method of constructing a concrete tower and an assembly for constructing a concrete tower.

BACKGROUND

The wind power harvested by a wind turbine increases with wind speed and rotor diameter. A greater rotor diameter requires a greater nacelle height which entails the further advantage that wind speed typically increases with height above ground. Thus, with the desire for always greater rated wind turbine powers, there is a trend to higher wind turbine towers. As wind speeds and rotor diameters increase, so do the lateral loads on the tower. For this reason the average diameters of wind turbine towers have been increasing throughout the years.

Usually, wind turbine towers are fabricated from steel or concrete. The towers are produced in cylindrically or frusto-conical sections which then are brought to the site where the wind turbine is to be erected. The dimensions of such sections of tall wind turbine towers are approaching limits set by the infrastructure of various countries. Such limiting aspects may include headroom under bridges, tunnel heights, maximum allowable weight or the radii of roundabouts.

The increasing number of wind power installations is also causing difficulties because the equipment needed for the transportation of the tower sections is not available in the required quantities. Thus, installation of new wind turbines may be delayed due to logistic problems. For this reason WO 01/07731 proposes constructing the wind turbine tower at the installation site of the wind turbine by using a slipforming technique.

SUMMARY

As aspect relates to proving an improved method and an assembly for constructing a concrete tower.

The method includes steps of:
a) erecting a central pillar;
b) mounting a platform on the central pillar;
c) setting a slipform defining a portion of the concrete tower;
d) pouring liquid concrete from the platform into the slipform;
e) leaving the liquid concrete to solidify in the slipform; and
f) repeating steps c) through e) to form further portions of the concrete tower. Each of the further portions of the concrete tower is formed on top of at least a preceding one of the portions of the concrete tower.

Embodiments of the invention provide an advantageous way of constructing a concrete tower. The inventive method is especially useful for constructing a tower of a wind turbine including a nacelle arranged on the tower and a wind rotor connected to the nacelle. It is an advantage of the invention that the means for constructing the concrete tower as well as the required materials can be transported easily to any place that can be reached by standard trucks. Accordingly, wind turbines can be erected at almost any suitable site regardless of the local infrastructure.

The liquid concrete may be prepared on the platform or it may be provided from suitable means arranged on ground level. In the latter case the liquid concrete may simply pass through the platform before being poured into the slipform. Thus, the step of pouring liquid concrete from the platform into the slipform should be interpreted as comprising both a provision of liquid concrete from a source or supply arranged on the platform as well as providing liquid concrete from a source or supply not arranged on the platform and merely passing through the platform. The slipform may be held by the platform or the central pillar or may attach to the solidified portions of the concrete tower just below the portions to be formed. Embodiments of concrete tower of the invention may be built on a suitable foundation or even on a partial tower built using alternate constructing methods. Similarly, the (partial) tower built using the method of the invention may be set up to carry a second partial tower, e.g. a steel tower which may have a smaller maximum diameter than the concrete tower, to further increase the total height of the resultant hybrid tower. Due to its smaller maximum diameter, the second partial tower may be transported to the site without difficulty. This method of constructing a hybrid tower has an additional advantage in that the second partial tower may be produced and delivered while the partial concrete tower is being constructed resulting in a faster erection of the complete tower.

Preferred embodiments of the inventive method further comprise a step of raising the platform on the central pillar. The raising the platform may be performed either by raising the platform from a first height to a second height before repeating the corresponding steps of the inventive method for forming further portions of the concrete tower or it may be performed in a continuous process while constructing the concrete tower. In this way towers of great height may be constructed because the platform will be raised in accordance with the current height of the unfinished tower. The maximum height of the finished tower will be only limited by the height of the central pillar, however, using e.g. lattice structures the central pillar may reach heights in the range of hundreds of meters which is more than enough for any type of present wind turbines. Furthermore, it is possible to support at least the lower parts of the central pillar through the unfinished tower which further increases the maximum height of the central pillar. Raising the platform can be carried out using automated elevator means arranged on the platform and/or the central pillar. Alternatively, a crane or similar external means may be used.

The method of the invention may further comprise a step of increasing a height of the central pillar before repeating steps c) through e). In such embodiments of the invention, the central pillar only needs to be high enough to form the current portion(s) of the concrete tower and may grow along with the unfinished concrete tower. In some embodiments of the inventive method, the steps of raising the platform and the step of increasing a height of the central pillar may be performed as a single step by using an expandable, e.g. hydraulic, central pillar.

Increasing the height of the central pillar may comprise adding a pillar portion to the central pillar. The added pillar portion will simply be mounted on the top of the central pillar thereby extending the central pillar. For such embodiments lattice structured pillars are especially suitable because such pillars provide both a low weight and high stability.

In a preferred embodiment of the invention, adding the pillar portion may be carried out using a crane arranged on the platform for lifting the pillar portion to a top end of the central pillar. In this way no external lifting means are required for constructing the concrete tower. It is especially useful if the platform is also adapted to raise by means of automated elevator means as explained above.

Preferably, the central pillar is arranged in the centre of the concrete tower. In this way the entire perimeter of the (usually cylindrical or frustoconical) tower or tower portion can be reached at substantially equal distance from the platform. Furthermore, using horizontal bars or the like the central pillar may reliably be supported by the unfinished concrete tower.

In some embodiments of the invention, the central pillar may be left in the finished concrete tower to form part of the concrete tower. For example, the central pillar may be used as support for cables, an elevator or simply for climbing the tower. This removes the need for adding appropriate means for such purposes after finishing constructing the concrete tower. In such cases unnecessary devices present on the platform such as a crane, means for pouring or preparing liquid concrete and even the platform itself may be disassembled and hoisted down for reuse thereby reducing the total cost of the construction.

Preferably, the method involves reducing a diameter of the further portions (measured from one side of the concrete tower to the other) and/or a wall thickness of the further portions as a height of the concrete tower in construction increases. This results in a tapered tower which is a preferred tower form for structural reasons.

Each portion of the concrete tower may extend along only a part of a perimeter of the concrete tower. Furthermore, an orientation of a top side of each portion of the concrete tower may be acute-angled with respect to a horizontal direction such that a series of subsequent portions of the concrete tower assume a spiral form. In this way it is possible to gradually decrease the diameter of the concrete tower or its wall thickness easily.

A further aspect provides an assembly for constructing a concrete tower. The assembly includes a central pillar, at least one slipform defining a portion of the concrete tower and a platform mountable on the central pillar and comprising means for pouring liquid concrete into the at least one slipform. The means for pouring liquid concrete may include concrete feeding pipes. Furthermore, the concrete may be prepared from powder and water on the platform itself using suitable means.

Preferably, the platform is movable along the central pillar in a vertical direction. Alternatively or additionally the platform may be rotatable about the central pillar.

The central pillar may be adapted to extend vertically. However, it is also possible to construct the central pillar from a plurality of pillar portions which is why a further embodiment of the assembly comprises one or more pillar portions mountable on the central pillar or on another one of the pillar portions.

The platform may further comprises a crane adapted to lift one of the pillar portions to a top end of the central pillar.

BRIEF DESCRIPTION

Figure 2:
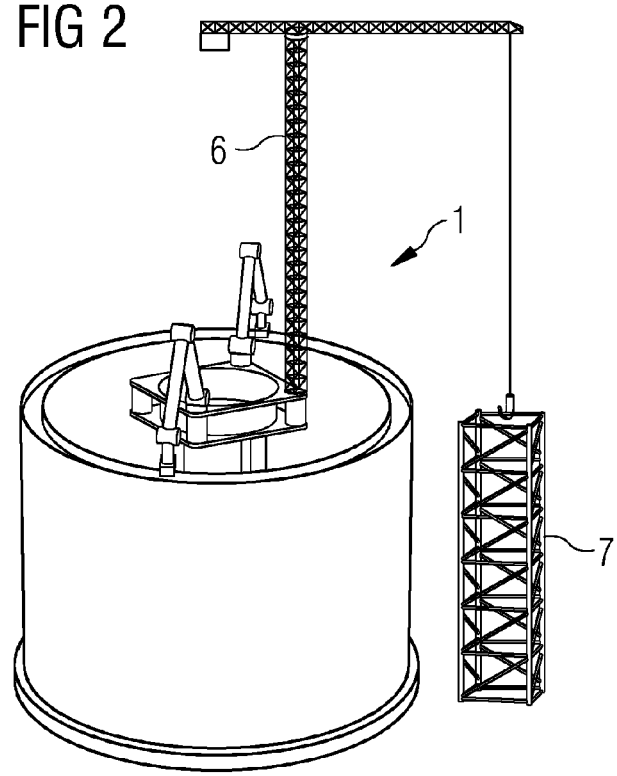
Figure 3:
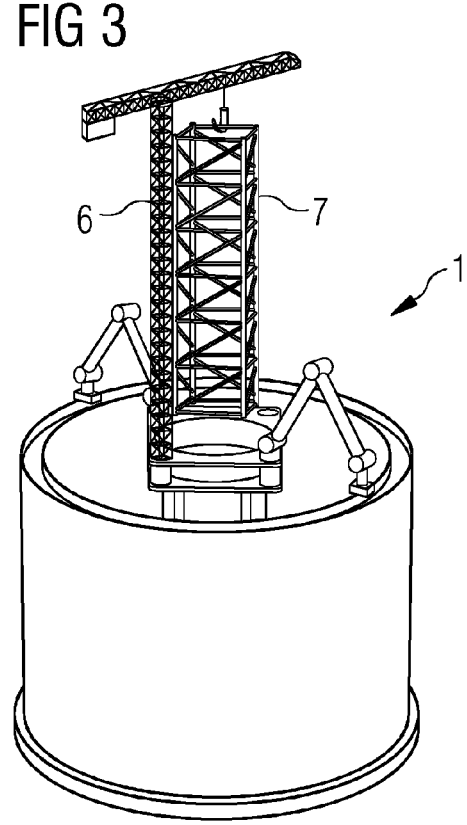

Some of the embodiments will be described in detail, with reference to the following figures, wherein like designations denote like members, wherein:

FIG. 1 shows an embodiment of an assembly; and
FIG. 2 illustrates an embodiment of a method of extending a central pillar using an embodiment of the invention; and
FIG. 3 illustrates an embodiment of a method of extending a central pillar using an embodiment of the invention.

DETAILED DESCRIPTION

FIG. 1 shows an embodiment of the invention that may be used for the inventive method of constructing a concrete tower. According to this embodiment of the invention, an assembly 1 comprises a central pillar 2 which preferably has a lattice structure for a good ratio between weight and stability. A platform 3 is arranged on the central pillar 2. The platform 3 may be rotatable about the central pillar 2. The platform 3 may be adapted to move vertically along the central pillar 2. The platform 3 of the embodiment shown in FIG. 1 comprises means for pouring liquid concrete into a slipform 4. In the example of FIG. 1 concrete feeding pipes 5 function as pouring means. The concrete feeding pipes 5 are connected to a concrete reservoir or means for preparing liquid concrete from powder and water. The concrete reservoir and/or the means for preparing liquid concrete may be arranged on the platform 3 or on the ground. The slipform 4 may be held by the platform 3 or the central pillar 2. However, it is also possible to fasten the slipform 4 to the lower parts of the unfinished concrete tower. If the slipform 4 is held by the platform 3, a continuous slipforming process may be easily used wherein concrete is constantly poured into the slipform 4 while the platform raises on the central pillar 2 as the liquid concrete solidifies. The concrete feeding pipes 5 can be adapted to pour concrete at a variable distance from the platform 3 in order to allow for variable diameters of the concrete tower or of the tower portion being constructed. The platform 3 may comprise a crane 6 arranged on the platform 3. The crane 6 may serve for lifting materials and tools to the platform 3. Furthermore, the crane 6 may serve for lifting additional pillar portions to the top end of the central pillar 2 for extending the central pillar vertically. In this way the central pillar 2 may be extended by mounting additional pillar portions as the concrete tower grows while slipforming. The assembly comprising a basic portion of the central pillar 2, the platform 3 and the crane 6 arranged on the platform 3 can be set up at the site of the concrete tower using a small standard crane. Once the assembly has been set up, no further tools are required other than those that form part of the assembly.

FIGS. 2 and 3 illustrate a method of extending a central pillar using an embodiment of the invention. In FIGS. 2 and 3 a lower section of the concrete tower has already been constructed. In FIG. 2 the platform 3 is already arranged at or close to the top end of the central pillar 2 and thus cannot be raised any further. Since the height of the finished lower section of the concrete tower roughly reaches that of the platform, it becomes difficult to continue constructing the concrete tower. Thus, the central pillar 2 needs to be extended by mounting a further pillar portion 7 onto the top end of the central pillar 2. The pillar portion 7 will be lifted by the crane 6 from the ground (FIG. 2) and will then be mounted onto the central pillar 2 thereby extending the central pillar 2 (FIG. 3). After the central pillar 2 has been extended, the platform 3 can be raised to a suitable height and slipforming may continue as described before.

The present invention has been described with respect to exemplary embodiments thereof which serve as illustrative examples of the invention. However, although specific embodiments have been described to explain the invention, deviations from these embodiments are possible. Hence, the scope of the invention shall not be limited by the described exemplary embodiments but only by the appended claims.

The invention claimed is:

1. A method of constructing a concrete tower, the method comprising:
   a) erecting a central pillar;
   b) mounting a platform on the central pillar;
   c) setting a slipform defining a portion of the concrete tower;
   d) pouring liquid concrete from the platform into the slipform;
   e) leaving the liquid concrete to solidify in the slipform;
   f) repeating steps c) through e) to form further portions of the concrete tower, wherein each of the further portions of the concrete tower is formed on top of at least a preceding one of the portions of the concrete tower; and
   increasing a height of the central pillar before repeating steps c) through e) by adding a pillar portion to the central pillar using a crane mounted on the platform for lifting the pillar portion to a top end of the central pillar;
   wherein the liquid concrete is poured into the slipform by one or more concrete feeding pipes connected to at least one of a concrete reservoir and a means for preparing liquid concrete;
   wherein the one or more concrete feeding pipes are connected to the central pillar, and extend from the central pillar to the slipform.

2. The method of claim 1, further comprising a step of raising the platform on the central pillar.

3. The method of claim 1, wherein the central pillar is arranged in a centre of the concrete tower.

4. The method of claim 1, further comprising leaving the central pillar in the finished concrete tower to form part of the concrete tower.

5. The method of claim 1, further comprising reducing a diameter and/or a wall thickness of the further portions as a height of the concrete tower in construction increases.

6. The method of claim 1, wherein each portion of the concrete tower extends along a part of a perimeter of the concrete tower.

7. The method of claim 1, wherein the method is utilized for constructing a tower of a wind turbine including a nacelle arranged on the tower and a wind rotor connected to the nacelle.

8. The method of claim 1, wherein the platform is rotatable about the central pillar.

9. An assembly for constructing a concrete tower, the assembly comprising:
   a central pillar;
   at least one slipform defining a portion of the concrete tower;
   a platform mountable on the central pillar and comprising a means for pouring liquid concrete into the at least one slipform; and
   a crane mounted on the platform to lift an additional pillar portion to a top end of the central pillar;
   wherein the liquid concrete is poured into the slipform by one or more concrete feeding pipes connected to at least one of a concrete reservoir and a means for preparing liquid concrete;
   wherein the one or more concrete feeding pipes are connected to the central pillar, and extend from the central pillar to the slipform.

10. The assembly of claim 9, wherein the platform is movable along the central pillar in a vertical direction.

11. The assembly of claim 9, wherein the central pillar is adapted to extend vertically.

12. The assembly of claim 9, further comprising one or more pillar portions mountable on the central pillar or on another one of the pillar portions.

13. The assembly of claim 9, wherein the platform is rotatable about the central pillar.

* * * * *